United States Patent
Turner et al.

(10) Patent No.: US 7,126,744 B2
(45) Date of Patent: Oct. 24, 2006

(54) STABILIZATION OF CLOSED LOOP OPERATION OF A TORSIONAL HINGED DEVICE

(75) Inventors: Arthur Monroe Turner, Allen, TX (US); Mark W. Heaton, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/136,348

(22) Filed: May 24, 2005

(65) Prior Publication Data

US 2006/0001940 A1    Jan. 5, 2006

Related U.S. Application Data

(60) Provisional application No. 60/584,294, filed on Jun. 30, 2004.

(51) Int. Cl.
*G02B 26/00* (2006.01)

(52) U.S. Cl. .................................. 359/298; 359/223
(58) Field of Classification Search ................. 359/298
See application file for complete search history.

(56) References Cited

U.S. PATENT DOCUMENTS 6,882,462 B1 * 4/2005 Helsel et al. ............... 359/292
2002/0050956 A1 * 5/2002 Gerhard et al. ................ 345/7

* cited by examiner

*Primary Examiner*—Scott J. Sugarman
*Assistant Examiner*—Richard Hanig
(74) *Attorney, Agent, or Firm*—William B. Kempler; W. James Brady, III; Frederick J. Telecky, Jr.

(57) ABSTRACT

Apparatus and methods for removing jitter and stabilizing the feed back system of a torsional hinged device with minimal changes to the system. The stabilization is accomplished by introducing a selected amount of lateral motion (in addition to the rotational motion) by creating asymmetry in the oscillating device or the drive torque applied to the device.

25 Claims, 4 Drawing Sheets

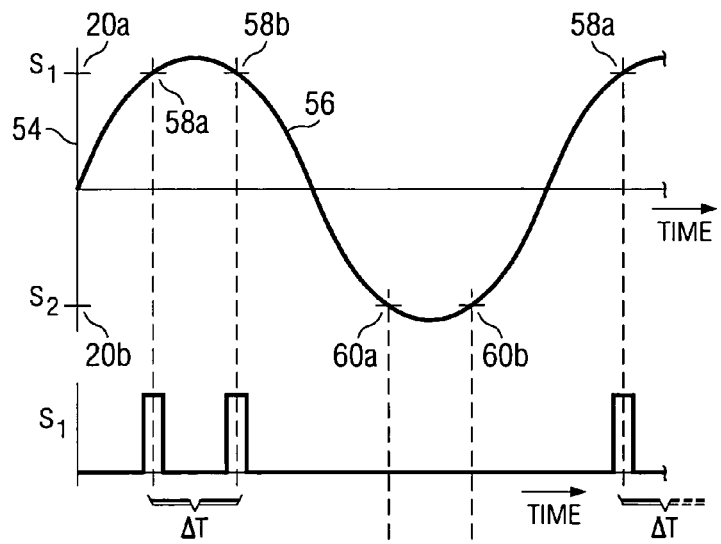
FIG. 3A
FIG. 3B
FIG. 3C
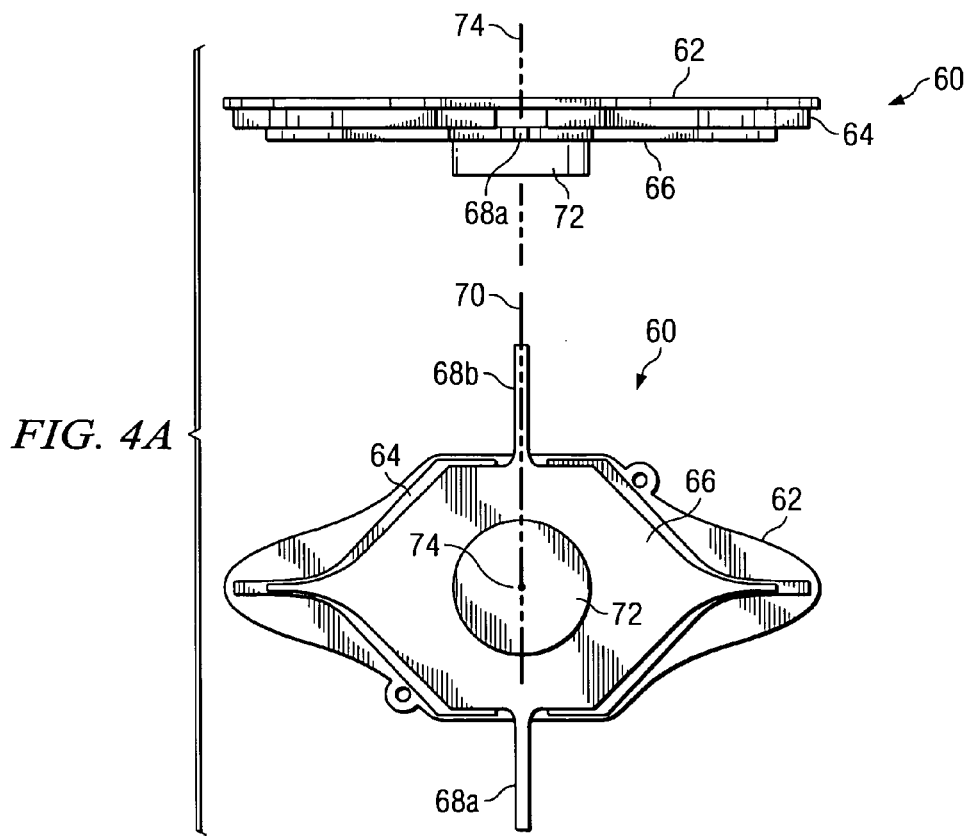
FIG. 4A

STABILIZATION OF CLOSED LOOP OPERATION OF A TORSIONAL HINGED DEVICE

This application claims the benefit of U.S. Provisional Application No. 60/584,294, filed on Jun. 30, 2004, entitled Stabilization Of MEMS Mirrors In Closed Loop Operation, which application is hereby incorporated herein by reference.

TECHNICAL FIELD

The present invention relates to a scanning apparatus and to methods and apparatus for stabilizing the velocity profile of such a scanning apparatus. More particularly, the present invention relates to methods and apparatus for stabilizing the velocity profile of a sweeping light beam used in printing and display devices.

BACKGROUND

Torsional hinged or galvanometer type mirrors provide an inexpensive alternate mechanism to rotating polygon shaped mirrors that generate a sweeping light beam suitable for use with visual displays and high speed printers. As will be appreciated by those skilled in the art, in order to print high quality images with a laser printer, the mirror which scans or sweeps the light beam across a light sensitive medium (such as a rotating drum) must scribe or follow the same path at the same velocity and with the same period for each scan or sweep. Failure to closely repeat the position and time for each scan or sweep is referred to as jitter. Torsional hinged or galvanometer mirrors are high Q resonant scanning oscillators with mirror tip speeds within a factor of 10 of the speed of sound. At these speeds, air resistance is the primary energy dissipation mechanism (drag) on the mirror. Air currents or air density fluctuations in the vicinity of the rotating mirror produce low frequency variations in the rotational amplitude. These amplitude variations create low frequency jitter in the scan beam that in turn produced artifacts in high quality printed images. A beam position sensor can be used to generate error signals proportional to the magnitude of the beam jitter and/or deviations from the desired velocity profile. These error signals in conjunction with a generic PI (Proportional plus Integral) or similar controller, determine the power to the drive mechanism and suppress the amplitude variations and reduce the variations in the beam sweep. Unfortunately, galvanometer or torsional hinged mirrors have vibrational modes other than the oscillation or rotational mode that produces the scanned beam. Therefore, if the control or feedback loop produces changes in the frequency components of the drive mechanism that excite the mirror's non-rotational modes, then undesirable vibrational modes can be excited. The excitation of some vibrational modes can produce beam motion, which can in turn produce an even larger error signal. The feed back loop may then try to suppress this larger signal by further increasing the drive correction, which further exacerbates the error. This unstable process amplifies or pumps the undesirable mode and the controlled system may oscillate or even diverge. In practice, this problem is observed as an oscillation in the error signal and mirror jitter at high proportional loop gain settings.

Therefore, an inexpensive torsional hinged scanning system with rotational amplitude stabilization would be advantageous. Such a system would be even more advantageous if it can be implemented with minimal changes to the existing structure of the operating system.

SUMMARY OF THE INVENTION

A solution to the jitter and stability problems discussed above is addressed by the present invention by producing an asymmetry in the mirror mass balance or an asymmetry in the torque producing drive fields. Such asymmetry introduces a slight lateral mirror motion along with the primary rotation or oscillation that is sufficient to change the error signals produced by the position sensor and thus substantially reduce amplification or pumping of the undesirable mode by the controller system. Consequently, the mirror's motion is stabilized and amplification of the undesirable vibrational modes is prevented. More specifically, the slight lateral motion has negligible impact on the scan beams velocity profile, yet allows closed loop control with low jitter and high proportional gain values. Thus, the "slight" lateral motion leaves sufficient margin to control real world systems and environmental disturbances.

To accomplish this, the invention comprises methods and apparatus for stabilizing the rotational motion of a torsional hinged device such as a torsional hinged mirror. The methods and apparatus of the oscillating assembly comprise a pivoting device, such as for example a mirror, supported by torsional hinges that extend along a pivot axis. A drive mechanism responsive to a drive signal causes oscillations of the pivoting device about the pivot axis at a selected speed and amplitude, which determines a velocity profile.

However, according to the present invention, the oscillating assembly includes selected asymmetrical features that intentionally generate lateral motion on the order of a few microns. Sensors are then positioned to periodically monitor the position of the pivoting device and generate signals representative of the monitored position. Control or feedback circuitry is connected to the sensor to receive the position signals and to determine the parameters of a drive signal that will maintain the oscillations of the pivoting device at the speed and amplitude of the selected velocity profile. The control circuitry provides the drive signal parameters to a power source, which in turn generates a drive signal having the determined parameters.

According to one embodiment, the selected asymmetrical feature that generates the lateral motion is to manufacture the pivoting device asymmetrically so that the center of mass of the device is offset from the pivot axis.

According to a second embodiment, the drive mechanism is constructed to generate an asymmetric or unbalanced torque on the pivoting device that has components that cause the lateral motion. As an example, one type of drive mechanism is the use of one or more electromagnetic coils that interact with one or more permanent magnets mounted on the torsional hinged pivoting device, such as for example, a mirror. Normally, care is taken to assure that the magnets are mounted such that the applied torque created by the magnetic forces that cause back and forth oscillations is balanced. However, according to this embodiment of the invention, the permanent magnets are intentionally positioned such that the torque is not balanced (i.e. asymmetrical) and such that a slight lateral motion is also generated.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 3A, 3B, and 3C are graphs showing the angle or position of an oscillating torsional hinged device and the signals produced by a pair of sensors used for feedback in the system of FIG. 1;

FIGS. 4A, 4B, and 4C illustrate a first embodiment of the invention wherein the lateral motion results from an offset of the device center of mass in a direction perpendicular to an axis normal to the surface of the device and perpendicular to the axis of rotation;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
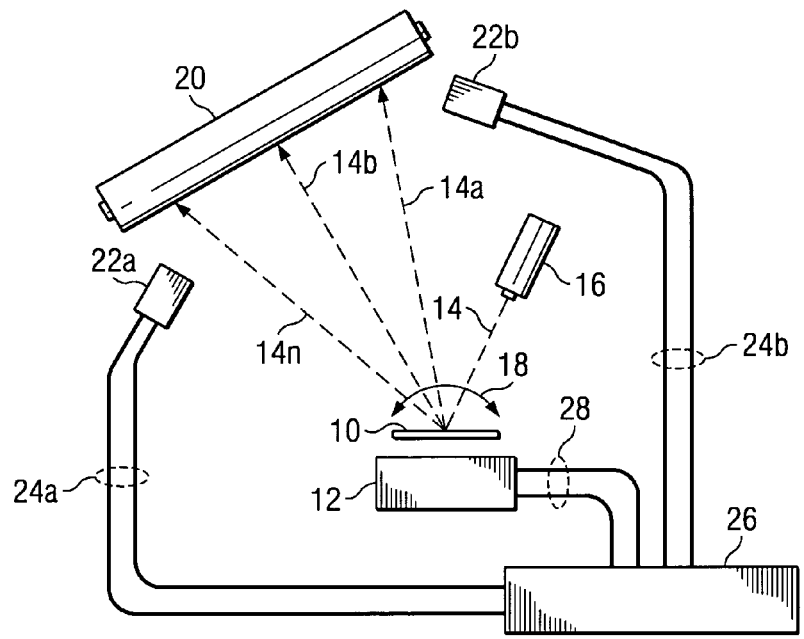
FIG. 1 is a simplified diagram of a torsional hinged scanning system, such as a scanning mirror that can benefit from the teachings of the present invention.

Referring now to FIG. 1, there is illustrated a simplified system diagram of a torsional hinged pivoting device that will benefit from the teachings of the present invention. The illustrated system is a laser printer using a resonant torsional hinged mirror as the printer "drive engine". As shown, the printer system comprises a resonant scanning device 10, which in the illustrative embodiment is a mirror. The scanning device 10 is driven by the application of a drive torque to the pivoting device, such as the scanning device or mirror 10. Although various techniques or drive mechanisms 12 may be used to generate the drive torque, one particularly suitable drive technique, to be discussed in detail hereinafter, is the interaction of a permanent magnet mounted to the back side of the operational of the mirror 10 with an adjacent electromagnetic coil (12b) as shown in detail in FIGS. 6A and 6B.

As will be appreciated by those skilled in the art, a laser printer includes a light beam 14 from source 16 that is directed toward the reflective surface of rotating mirror 10. The rotating mirror 10 oscillates or rotates back and forth as indicated by double headed arrow 18 to produce a sweeping beam of light indicated at 14a, 14b, and 14n on a photosensitive medium 20, such as a photosensitive drum. Also included is an optical beam sensor and preferably a pair of optical beam sensors 22a and 22b that provide a signal pulse through wire pairs 24a and 24b each time the reflected light beam 14a–14n passes over the optical beam sensor or sensors fixed at a known location. The signal pulse on wire pairs 24a and 24b are provided to monitor and control circuitry 26, which uses the signals to determine the necessary parameters (for example start time and duration) of a drive pulse to stabilize and maintain the rotation amplitude of the mirror rotation. If the drive mechanism 12 is magnetic, then in the illustrated example, a power source is monitored and control circuitry 26 will generate a drive pulse in response to the determined parameters that is provided through connecting wires 28 to a magnetic coil. According to the present invention, however, an asymmetrical feature is introduced with respect to the torsional hinged device or the application of the drive torque. This asymmetry purposely introduces a slight lateral motion to the torsional hinged device in addition to the desired back and forth rotational or oscillating motion. The lateral motion should be no greater than about ±1 micron for each degree of primary rotational motion, and preferably no greater than about ±0.5 microns for each degree of primary rotational motion. As will be appreciated by those skilled in the art, the lateral motion will, of course, effect or change the movement of the light beam 14a–14m across the photosensitive drum 20. This movement produces a slight hammock style swing on top of the rotational motion and will produce slight changes in the optical beams velocity profile. These changes are reproducible from scan to scan and do not produce jitter. Jitter will occur only if the velocity profile varies over time. For purposes of the invention, the velocity profile of the oscillating mirror should be changed no more than about ±0.06% and preferable about ±0.03% due to the introduced lateral motion.

Figure 2:
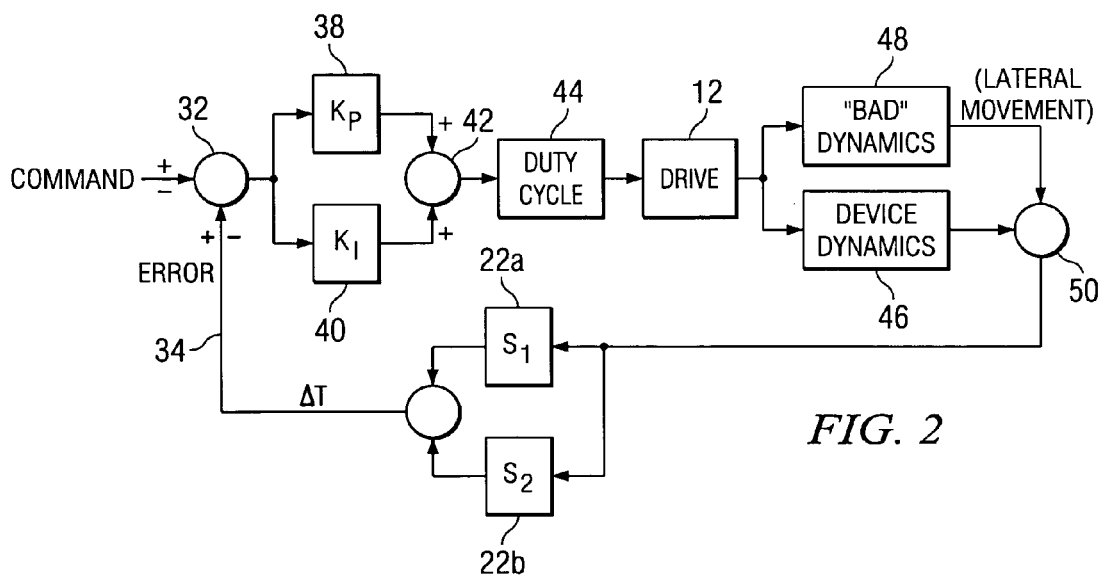
FIG. 2 illustrates a block diagram of a drive and feedback circuit suitable for use in the system of FIG. 1.

As was discussed above, monitor and control circuitry 26 receives signal pulses from sensors 22a and 22b and uses these pulses to maintain the oscillating device at the correct rotational amplitude. Referring now to FIG. 2, there is a block diagram of a functional closed loop schematic of such a stabilized feedback or monitor and control circuitry. As shown, a base drive command or signal that maintains a desired oscillation frequency and amplitude is periodically provided on input 30. The base drive signal on input 30 is a default value for a known frequency and known detector location. The base signal is combined at node 32 with an error signal input on line 34, which represents a time deviation from the expected timing of the pulses from beam detectors 22a and 22b. The resulting signal on line 36 is provided to proportional correction ($K_p$) circuitry 38 and integral correction ($K_I$) circuitry 40. The output of the $K_p$ and $K_I$ circuits are then combined at node 42 and sent to duty cycle circuitry 44, which receives the corrected signal and changes the duty cycle as necessary to correct the velocity profile of the oscillating device (e.g. a mirror). Although other parameters could be changed to correct the velocity profile of the oscillating device, if a permanent magnet-magnetic coil driving arrangement is used to provide torque to the assembly, changing the duty cycle or duration of a constant amplitude drive pulse has been found to be particularly effective. Thus, as shown, a drive pulse having a known start time and a duty cycle responsive to changes in the velocity profile of the oscillating device is provided to the drive mechanism 12, which according to one embodiment is an electromagnet coil. Thus in a perfect world, and as a result of the dynamics of the resonant torsional hinged device indicated by box 46, the resonant device would continue to operate at the known resonant frequency and at a repeatable speed or velocity profile so long as the base drive pulse on line 30 is provided to the electromagnet coil. Unfortunately as discussed above, other factors such as air currents and vibrations, etc. apply undesirable forces on the torsional hinged device that cause scan direction variations or jitter in the movement or velocity profile of the torsional hinged device. This scan velocity variation is represented by the box 48 labeled "bad" dynamics. Therefore, as shown at node 50, the combination of the device dynamics represented by box 46 and the "bad" dynamics 48 result in a change in the velocity profile or the time that the pulses are due to be generated by sensors 22*a* and 22*b*. However, these scan velocity changes due to the "bad" dynamics may also result in error signals with frequency components at a different frequency than the feed back loop is designed for. Therefore, although the feedback loop may normally correctly compensate for changes, reflected or alliased data signal may also fall in regions of the control band width of the feedback loop. This alliased data signal may then cause changes in the drive signal that exacerbates the jitter problem rather than reducing or attenuating the problem.

FIGS. 3A, 3B, and 3C help illustrate this issue. Each of FIGS. 3A–3C show time as the horizontal axis 52 of the graph. The vertical axis 54 of FIG. 3A represents the rotational angle of the oscillating device. Therefore, as shown, the curve 56 in FIG. 3A illustrates how the angular position of the resonant torsional hinged device varies with time. The vertical axis 54 of FIG. 3A also illustrates angular positions of the light beam at which sensor 22*a* and sensor 22*b* will generate a pulse. Thus for each peak (maximum and minimum) of the sinusoidal curve 56 representing the angular position of the oscillating device, there are a pair of pulses generated by sensors 20*a* and 20*b* respectively as indicated by reference numbers (58*a*–58*b*) and (60*a*–60*b*). FIG. 3B illustrates the pulses generated by sensor 20*a* and FIG. 3C illustrates the pulses generate by sensor 20*b*.

Figure 4B:
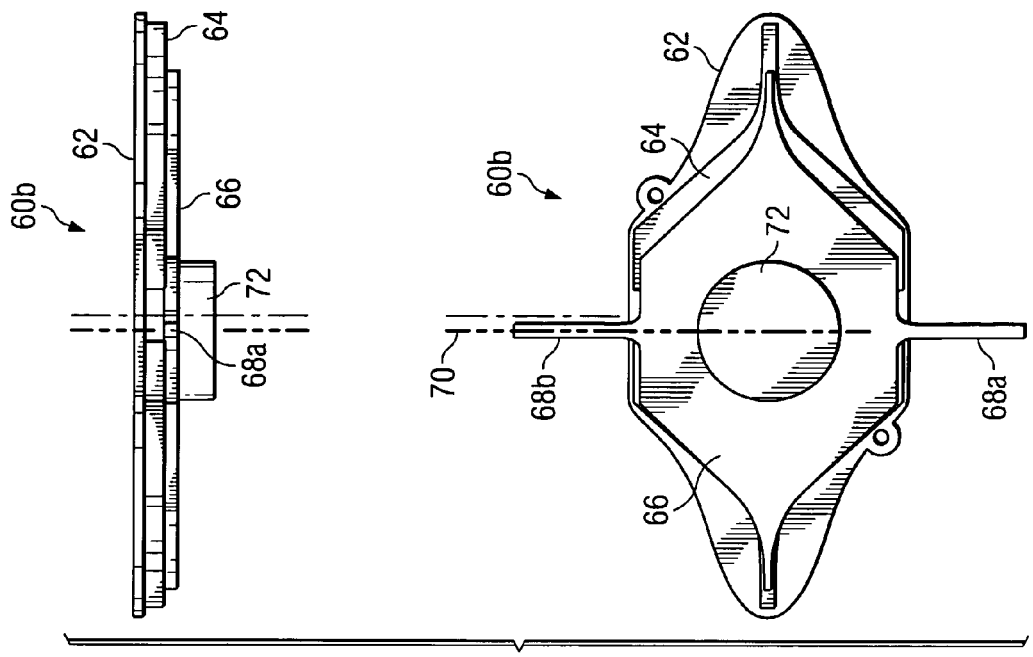

As mentioned above, the present invention solves these problems by intentionally introducing lateral motion in the resonant oscillating device's motion by intentionally designing asymmetry into the oscillating device. Therefore, according to a first embodiment shown in FIGS. 4A, 4B, and 4C, there is disclosed a technique for offsetting the center of mass of a torsional hinged mirror driven by a single permanent magnet that interacts with an electromagnetic coil. Referring to FIG. 4A there is illustrated a side view and a back view of a symmetrically balanced torsional hinged mirror device 60. As shown, the mirror device 60 includes a reflective portion 62, a support portion 64, and a hinge layer 66. Hinge layer 66 defines a pair of torsional hinges 68*a* and 68*b* that provide rotation about pivot axis 70. Also as shown, there is a permanent magnet 72 that is centered on pivotal axis 70. Thus, it will be appreciated that the reflective portion 62, the support portion 64, and the hinge layer 66 are symmetrical. Further, since the permanent magnet 72 is centered on the pivot axis 70, the center of mass of the combination structure is centered on the pivot axis of rotation.

Referring to FIG. 4B, however, it is seen that the combination mirror structure 60*a* is identical to the combination structure 60 of FIG. 4A except that permanent magnet 72*a* is positioned or offset from the normal line or axis 74 a selected distance as indicated by double arrows 76.

As will be appreciated, the offset permanent magnet 72*a* will result in the center of mass of the combination structure 60*a* also being offset. This offset center of mass will result in the addition of an intentional lateral motion to the resonant oscillating device's primary rotational motion. This lateral motion is a change in the selected velocity profile of the torsional hinged device and should be limited to no more than about a ±0.06% change of the selected velocity profile and preferable no more than a ±0.03% change.

Figure 4C:
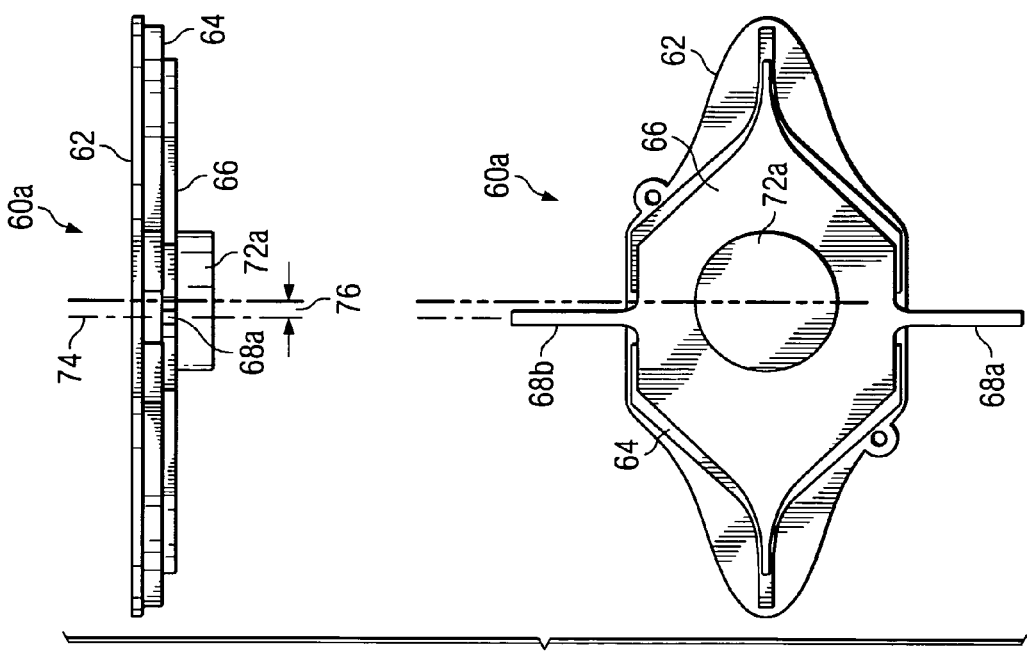

The combination structure 60*b* of FIG. 4C is also similar to the structure 60 of FIG. 4A, except that reflective portion 62 and the support portion 64 are offset with respect to the hinge layer 66. In this embodiment, the permanent magnet 72 is still centered over the pivot axis 70 but again the center of mass of the complete combination structure will be offset from the pivot axis.

Figure 5:
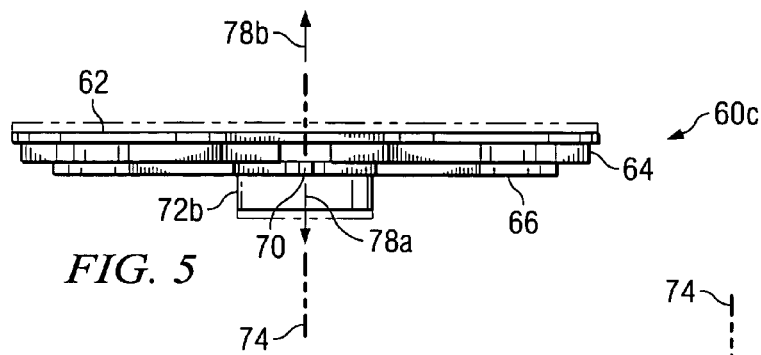
FIG. 5 illustrates a second embodiment wherein the device center of mass is offset along the axis normal to the surface of the device and perpendicular to the axis of rotation.

The structure 60*c* of FIG. 5 is also similar to the structure 60 of FIG. 4A, except the center of mass is offset along the axis or normal line 74 away from the pivot axis 70. This may be accomplished by changing the thickness of the permanent magnet 72*b*. For example, if the magnet thickness is increased, the center of mass will move away from the pivot axis 70 in the direction of arrow 78*a*. Contrarily, if the magnet thickness is decreased, the center of mass will move away from the axis of rotation along the arrow 78*b*. It will also be appreciated that such asymmetry may also be accomplished by changing thickness or density of any of the other components of the torsional hinged device.

Figure 6A:
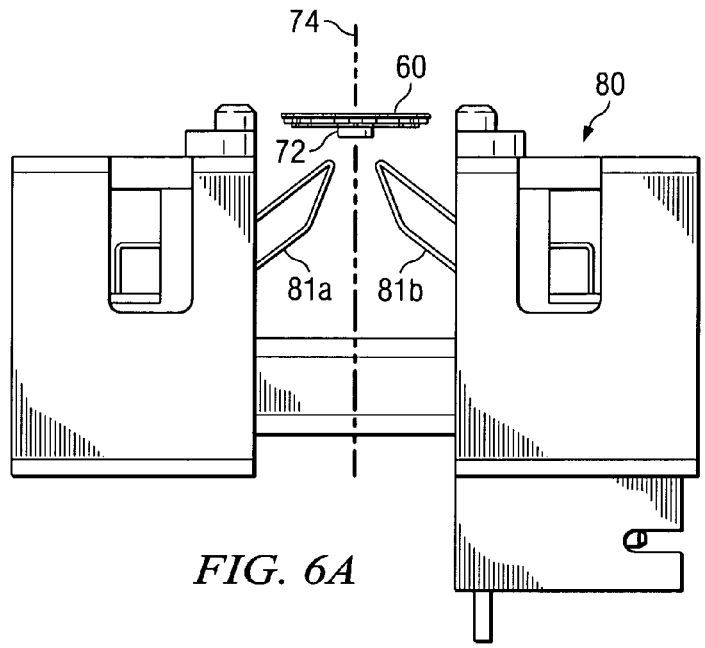
FIGS. 6A and 6B illustrate a third embodiment wherein the drive center of the device is offset with respect to the device center of rotation.
Figure 6B:
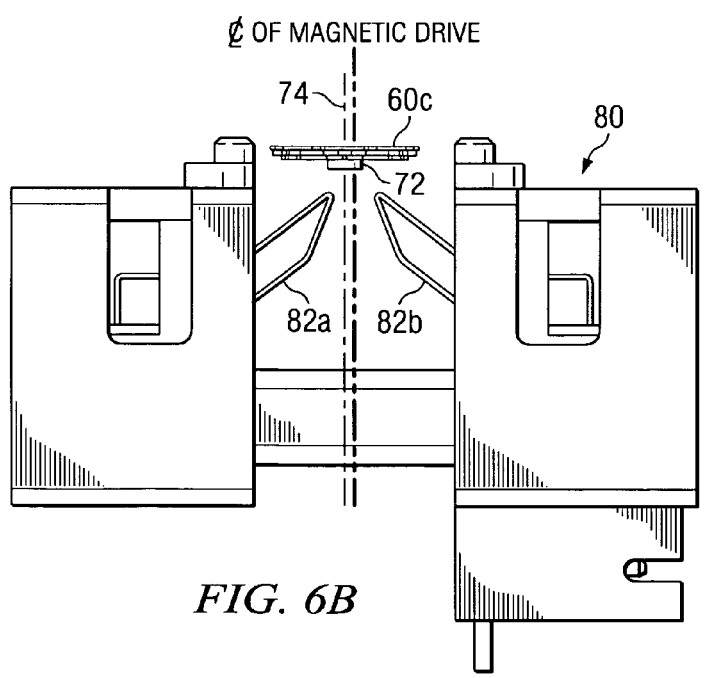

FIGS. 6A and 6B illustrate still another embodiment for creating asymmetry of the oscillating mirror. FIGS. 6A and 6B are illustrated using the symmetrical structure 60 of FIG. 4A. In addition, the structure 60 of FIG. 4A is shown with the magnetic drive mechanism 80 that interacts with permanent magnet 72 to cause rotational torque on structure 60. It is also seen in FIG. 6A that mirror structure 60 is located such that its vertical axis (or normal) 74 is equally spaced between magnetic core arms 82*a* and 82*b*. Thus, as the core arms 82*a* and 82*b* are switched to continuously alternate between providing a north pole and a south pole, the magnetic interaction with permanent magnet 72 will provide such magnetic forces that oscillate the mirror structure about its pivot axis 70. However, according to another embodiment of the invention as shown in FIG. 6B, the torsional hinge structure 60*c* is positioned such that the normal line or axis 74 is closer to core arm 82*a* and further away from magnetic core arm 82*b*. This offset in the relative position of the core arms will result in the application of an asymmetrical magnetic force on structure 60*c*, which will in turn cause the intentional lateral motion.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to

What is claimed is:

1. A torsional hinged scanning system comprising:
an oscillating assembly comprising a pivoting device supported by a pair of torsional hinges lying along a pivot axis and a drive mechanism responsive to a drive signal for oscillating said pivoting device about said pivoting axis according to a selected velocity profile, said scanning system including asymmetric features that generate lateral motion due to the primary oscillation of the device;
a sensing device for sensing the position of said pivoting device and generating signals representative of said sensed position;
control circuitry connected to receive said signals representative of said sensed position and for determining the parameters of said drive signal necessary to maintain said velocity profile.

2. The system of claim 1 wherein the center of mass of said pivoting device is offset with respect to the pivot axis.

3. The system of claim 2 wherein said drive mechanism comprises a permanent magnet mounted to said oscillating assembly and an electromagnetic coil that interacts with said permanent magnet to create rotational torque on said oscillating assembly, and wherein said drive signal is a voltage pulse of a selected duration applied to said electromagnet coil.

4. The system of claim 3 wherein the center of mass of said permanent magnet is offset with respect to said pivot axis.

5. The system of claim 2 wherein said oscillating device is asymmetrical with respect to said torsional hinges.

6. The system of claim 1 wherein said drive mechanism generates unbalanced rotational torque on said pivoting device to cause said lateral motion.

7. The system of claim 6 wherein said drive mechanism comprises a permanent magnet mounted to said oscillating assembly and an electromagnetic coil that interacts with said permanent magnet to create rotational torque on said oscillating assembly, and wherein said drive signal is a voltage pulse of a selected duration applied to said electromagnet coil.

8. The system of claim 7 further comprising a magnetic core having a pair of arms for guiding magnetic flux lines generated by said electromagnetic coil toward said permanent magnet mounted on said oscillating device.

9. The system of claim 8 wherein said magnetic core arms are positioned asymmetrically with respect to said permanent magnet.

10. The system of claim 1 wherein said oscillating assembly is a torsional hinged mirror.

11. The system of claim 2 wherein said offset of said center of mass is along a line normal to the surface of said oscillating assembly.

12. The system of claim 2 wherein said oscillating device is positioned asymmetrically with respect to said pivot axis.

13. The system of claim 1 wherein said lateral motion is no greater than about ±1 micron for each degree of primary rotational motion.

14. The system of claim 13 wherein said lateral motion is no greater than about ±0.5 micron for each degree of primary rotational motion.

15. The system of claim 1 wherein said generated lateral motion results in a change in the velocity profile no greater than about a ±0.6% change.

16. The system of claim 1 further comprising circuitry connected to said control circuit for generating said drive signal.

17. A method for stabilizing the rotational motion of a torsional hinged device comprising the steps of:
providing a pivoting device supported by torsional hinges lying along a pivot axis;
oscillating said pivoting device about said pivot axis according to a selected velocity profile in response to a drive signal;
introducing lateral motion to said oscillating device;
sensing the position of said oscillating device and generating a signal representative of said position;
receiving said generated signal to compute the drive signal required to maintain said velocity profile; and
generating said drive signal.

18. The method of claim 17 wherein said step of introducing lateral motion comprises the step of providing asymmetry in the balance of said pivoting device about said pivot axis.

19. The method of claim 17 wherein said oscillations of said device results from the interaction of at least one permanent magnet mounted on said oscillating device and an electromagnetic coil receiving a drive signal.

20. The method of claim 19 further comprising the step of asymmetrically mounting said permanent magnet on said torsional hinged device with respect to said pivoting axis.

21. The method of claim 17 further comprising fabricating said pivoting device asymmetrically with respect to said torsional hinges.

22. The method of claim 17 wherein said step of introducing lateral motion comprises the step of providing asymmetry in the drive torque applied to said pivoting device that causes oscillations.

23. The method of claim 17 wherein said lateral motion represents a change in the velocity profile of said pivoting device no greater than about a ±0.06% change.

24. The method of claim 23 wherein said change is no greater than about a ±0.03% change.

25. The method of claim 17 wherein said introduced lateral motion is no greater than about ±1 micron for each degree of primary rotational motion.

* * * * *